United States Patent [19]
Turner

[11] 3,815,671
[45] June 11, 1974

[54] PIPELINE FORCED AIR CONVECTIVE HEAT TRANSFER SYSTEM

[76] Inventor: Jerry Brent Turner, 17203 Central Pk., Hazelcrest, Ill. 60429

[22] Filed: Dec. 5, 1972

[21] Appl. No.: 312,290

[52] U.S. Cl.................................. 165/47, 165/128
[51] Int. Cl............................................. F24h 3/00
[58] Field of Search ............ 165/47, 128, 129, 135, 165/136, 45

[56] References Cited
UNITED STATES PATENTS
2,541,162   2/1951   Hermann ............................ 165/129

Primary Examiner—Charles Sukalo

[57] ABSTRACT

A system using air for removing heat from a pipeline laid in permafrost areas has an insulated duct-like member encircling an elevated section of the pipeline with an annular air flow space therebetween and at least one top outlet and one bottom inlet thereto. The outlet and the inlet are spaced apart along the longitudinal axis of the pipeline. An air deflector is positioned to deflect air into the inlet thereby increasing natural convective air forces arising inside the convective heat transfer system. The insulation standoff distance, the ratio of the inlet-to-annular space areas of flow, and the spacing between inlet and outlet ports are set for maximum advantage. Additional advantage is obtained by using an elongated outlet stack.

16 Claims, 2 Drawing Figures

PATENTED JUN 11 1974 3,815,671

PIPELINE FORCED AIR CONVECTIVE HEAT TRANSFER SYSTEM

BACKGROUND OF THE INVENTION

This invention relates to a forced air convective heat transfer system for removing heat from an oil pipeline constructed in permafrost regions.

Heat transfer from an oil pipeline is frequently an important consideration in the design of a pipeline. Generally, it is desirable to limit heat loss since increasing the oil temperature usually decreases the oil viscosity and lowers pump horsepower requirements. There are, however, times when heat transfer from an oil flowline or pipeline is desirable, and, in some situations, for the same line, there are times when heat transfer is desired and other times when heat transfer is not desired. This latter situation occurs when the oil pipeline passes through permafrost regions. When the pipeline is shut down, it is desirable to reduce the rate of heat loss. As oil cools it tends to gel and increase in yield strength thereby increasing difficulties involved in restarting oil flow. In addition at moderate flow rates, it may be desirable to limit heat loss while at higher flow rates it may be desirable to remove heat from the oil. For example, pump energy converted into thermal energy may lead to excessively high oil temperatures if heat loss is insufficient. There are maximum temperature limitations on the pipeline which result from permafrost thaw and pipeline stress considerations. The flow rate in a pipeline is subject to fluctuation and to future increases as oil production in an area is developed and increased. Other factors affecting heat transfer are also subject to fluctuation, especially the change in prevailing ambient temperature which occurs during winter and summer. Another factor subject to seasonal change is the permeability of the soil which affects water convection around buried pipeline. Moreover, other design considerations affecting heat transfer are subject to unanticipated or unrealized conditions. Yet, modification of the pipeline may be impractical. It is, therefore, desirable that means for increasing or decreasing heat transfer from an oil pipeline passing through permafrost regions be provided and preferably installed on the pipeline when it is being constructed.

SUMMARY OF THE INVENTION

An apparatus or system for removing heat from an oil pipeline laid in a permafrost region by heat transfer to cooler atmospheric air is arranged to combine natural convective heated air forces with air current wind forces. One or more such systems are easily installed on an elevated section of the pipeline when the pipeline is being constructed and are readily shut off when there is no need for heat transfer, or opened when the need for heat transfer arises, or partially shut off or adjusted to changing conditions, such as changes in seasons, ambient air temperature, or oil flow rate.

Briefly, an elevated section of an oil pipeline is surrounded by insulation which stands off from the pipeline to form an annular air-conductive flow passage around the pipeline. At longitudinal spaced apart points, there are provided an inlet on the bottom side of the insulation and outlet on the top side so that cool air can enter the annular space and rise by natural convective forces to exit through the outlet in a flue-like stream. An air deflector is positioned and adapted to deflect wind driven air into the inlet to increase air flow through the system and to add to natural convective forces. An elongated passage or stack-like member may be installed at the outlet to increase natural convective draw. The inlet and outlet may be opened or closed when desired and the standoff distance, the spacing between inlet and outlet, the inlet flow area, and length of the outlet stack-like member may be adjusted to the desired heat transfer rate.

DETAILED DESCRIPTION OF THE INVENTION

Figure 1:
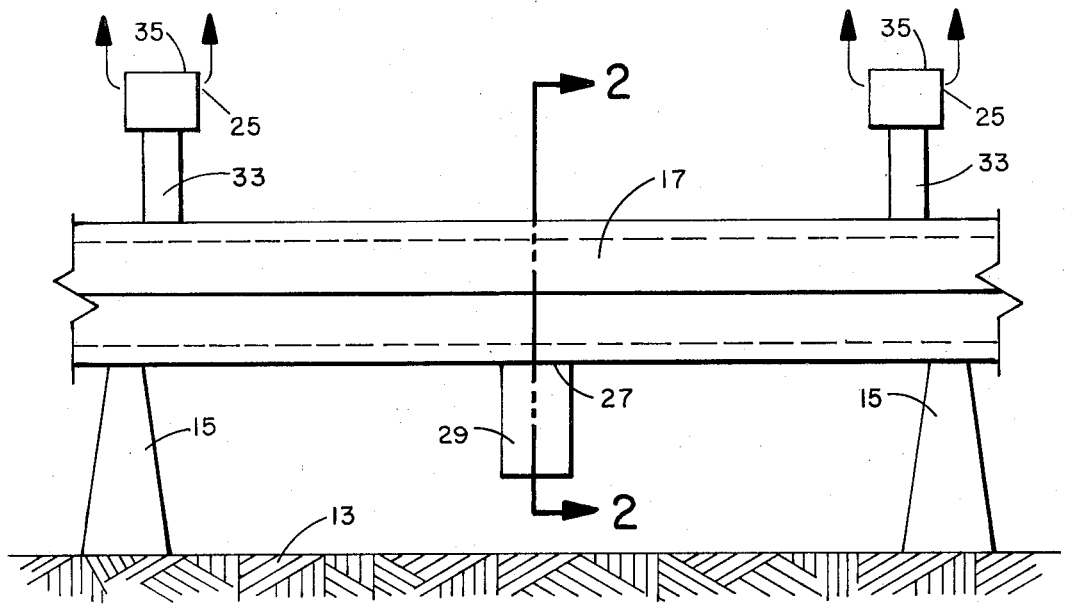
FIG. 1 shows a fragmented elevated section of pipeline surrounded by insulation forming an annular flow space with an inlet with deflector and two spaced apart outlets with stacks.
Figure 2:
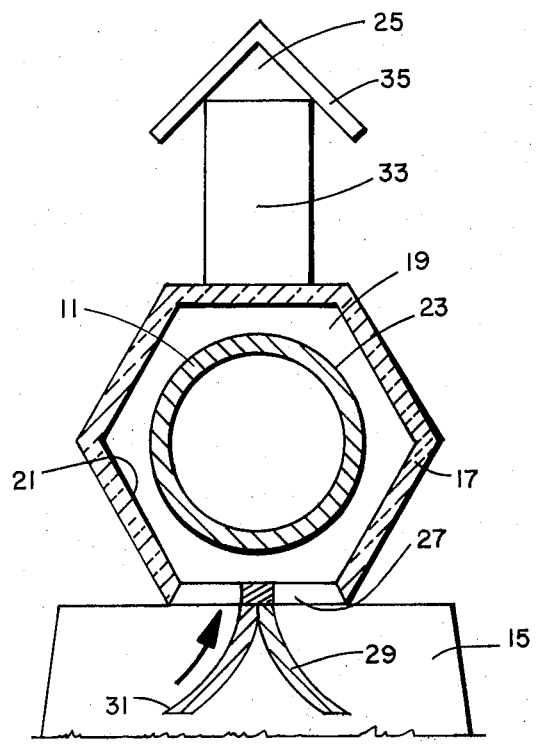
FIG. 2 is a fragmented, cross sectional view taken at 2—2 on FIG. 1.

A system for convectively cooling or removing heat from oil pipeline 11 is illustrated in FIGS. 1 and 2 wherein there is shown a section of the pipeline elevated above ground 13 on supports 15. Surrounding the section of the pipeline is insulating material 17 which acts as an annular insulating cover and is constructed in a manner such that there is annular air-conductive space 19 surrounding the pipeline formed by the standoff distance inner wall 21 of the insulating cover and outer wall 23 of the pipeline. Located on the top side of the pipeline, there is outlet 25 to the annular space which outlet is adapted to allow air to flow from annular space 19. Located on the bottom side of the pipeline, there is inlet 27 to the annular space which inlet is adapted to allow air to flow into annular space 19. Outlet 25 and inlet 27 are spaced apart one from the other along the longitudinal axis of the pipeline by a distance appropriately based on the desired rate of cooling or heat transfer. Extending below inlet 27 is air deflecting means 29 which is positioned and adapted to deflect atmospheric air or wind currents moving past the section of pipeline into the inlet. For illustration purposes, the air deflecting means is shown as a pair of wide members extending from bracket 31 and traversing inlet 27. The members have inclined or arcuate outer surfaces 31 extending far enough below the pipeline to catch wind or air currents from either side of the pipeline and deflect the moving air into the inlet.

A hexagonal insulating cover is shown since this minimizes construction difficulties and is easier to size and modify to correspond to the desired rate of heat transfer while maintaining a relatively uniform symmetrical annular flow space around the pipeline. This configuration also readily lends itself to adjusting the size of the inlet port and to opening or closing the inlet and outlet ports to allow or prevent convective heat transfer as conditions dictate. For example, adjustable panels may be used.

The inlet and outlet ports are respectively located on the bottom and top sides of the pipeline and the system is constructed on an elevated section of pipeline to take advantage of natural convective air flow forces and to increase these natural convective forces with deflected air forces. Natural convective forces arise when oil flows through the pipeline and atmospheric air colder than the oil flows into the inlet, around the pipeline and through the annular space to and out of the outlet. The colder inlet air is heated undergoing a reduction in air density and a change in kinetic energy causing the heated air in the annular space to rise and flow out of the outlet port at the top of the annular space. The escaping air creates a flue-like or draft-like effect which draws more cold air into the bottom inlet port. The air deflecting means deflects moving air currents striking outer surface 31 into the inlet thereby increasing the natural draw or convective forces. As a result, the driving force for flow of air through the annulus is established both by density difference and deflected moving air forces. The rate of heat transfer or heat flux is dependent on the mass rate of air flow and the inlet air temperature and a number of conditions as hereinafter set forth. The above-described system increases the mass rate of air flow and, consequently, increases heat flux or heat removal.

The main factors or conditions affecting the rate of heat transfer in a system of the type just described are the inlet or ambient air temperature, the mass rate of flow of the air, and the overall temperature difference between the oil pipeline and air flowing inside the annular space. When more heat transfer or heat flux is desired, there is, however, little that one can do to control the inlet air temperature except to increase the rate of inlet air flow. The entrance pressure loss due to flow convergence comprises a substantial portion of the total overall pressure loss in the system, for example 24 percent. The air deflecting means increases the pressure differential at the inlet and helps to increase the inlet mass rate of flow and the effective overall temperature difference. It has been found that the other main design factors affecting heat transfer in this type of system are the distance between the inlet and outlet ports, the annular standoff distance between the pipeline and insulating material, the ratio of the inlet port area of flow to the average annular area of flow, and the outlet design when an elongated stack-like outlet flow passage is provided.

Increasing the insulation standoff distance and decreasing the distance between the inlet and outlet ports increases the rate of heat transfer or heat flux. But there are practical limitations to the standoff distance. There are difficulties in fabrication and strength and increased expense. Moreover, heat loss through the insulating material when the convective system is closed depends on surface area. Increasing the standoff distance increases the surface area of the insulating material and necessitates thicker insulation to offset the increase in surface area. In studies of a convective heat transfer system, it was found that for inlet and outlet port spacings between 20 and 200 feet, when the heat loss from the pipeline per unit time is plotted against the standoff distance, the resulting curves show the effects of increasing standoff distance on heat loss are most likely to be greatest between 0 and 6 inches and thereafter the heat loss advantages resulting from increases in standoff distance are relatively small and are offset by the disadvantages just mentioned. Optimum advantages occur for standoff distances between 3 and 6 inches especially when the port spacing is between 20 and 100 feet. Therefore, in one embodiment of this invention, the insulation material is separated from the pipeline by an average standoff distance of between 3 and 6 inches. The port spacing is limited by the placement of supports 15 and other design conditions including the rate of heat transfer. The greatest advantage lies in port spacing between 20 and 100 feet.

In one phase of the aforementioned studies, it was found that increasing the ratio of the inlet flow area to the annular flow area increased the rate of heat transfer until a ratio of 4 was reached and thereafter the rate of heat transfer declined slightly. There are mechanical difficulties involved in using long inlet ports and a ratio of the area of flow of the inlet to the area of flow of the annular space of between 1 and 4 is much preferred.

The design of the outlet opening is relatively immaterial as long as the pressure drop is kept low since the exiting hotter air forms a flue-like rising stream of less dense air, but it was found that passing the exiting hotter air through an elongated stack-like flow passage 33 extending upward approximately perpendicular to the longitudinal axis of the pipeline did increase the rate of heat transfer. A stack 4 feet long increased the rate of heat transfer about 25 percent, but after a stack length of about 6 feet the rate of change in heat transfer was relatively small and the advantages to be gained by increasing the stack length above 6 feet are offset by design and fabrication difficulties and costs. The effect of the elongated exit passage was more or less independent of the spacing between the inlet and outlet ports and the annular standoff distance. As shown, elongated passage 33 is equipped with head 35 to prevent snow, rain, and the like from falling into the annular space. The head may be any sort of shape including the rotating or pivotable ventilator types.

Reasonable variations and modifications are practical within the scope of this disclosure without departing from the spirit and scope of the claims of this invention.

The embodiments of the invention in which an exclusive property or privilege is claimed are defined as follows:

1. A convective heat transfer system for an oil pipeline which is partially buried in permafrost comprising a section of an oil pipeline elevated above the ground and surrounded by insulating material in a manner such that there is annular air-conductive space surrounding said section of said pipeline between said insulation material and said pipeline, an outlet to said annular space located on the top side of said pipeline and adapted to allow air to flow from said annular space, an inlet to said annular space located on the bottom side of said pipeline and adapted to allow atmospheric air to flow into said annular space, said inlet and said outlet being spaced apart one from the other along the longitudinal axis of said pipeline, and an air deflecting means positioned and adapted to deflect atmospheric air moving past said section of said pipeline into said inlet thereby increasing natural convective air forces arising when oil flows through said section of said pipeline and atmospheric air colder than said oil flows into said inlet through said annular space and out said outlet and is heated by heat transfer from said oil through the walls of said pipeline to the cooler air flowing in said annular space.

2. The system of claim 1 wherein the ratio of the area of flow of the inlet to the area of flow of the annular space is between 1 and 4.

3. The system of claim 2 wherein the insulation material is separated from the pipeline by an average standoff distance of between 3 and 6 inches.

4. The system of claim 2 wherein the outlet is comprised of an elongated flow passage extending upward approximately perpendicularly to the longitudinal axis of the pipeline for a distance between 1 and 6 feet.

5. The system of claim 4 wherein the insulation material is separated from the pipeline by an average standoff distance of between 3 and 6 inches.

6. The system of claim 1 wherein the outlet is comprised of an elongated flow passage extending upward approximately perpendicularly to the longitudinal axis of the pipeline for a distance between 1 and 6 feet.

7. The system of claim 6 wherein the insulation material is separated from the pipeline by an average standoff distance of between 3 and 6 inches.

8. The system of claim 1 wherein the insulation material is separated from the pipeline by an average standoff distance of between 3 and 6 inches.

9. The system of claim 1 wherein the longitudinal spacing between the inlet port and the outlet port is between 20 and 100 feet.

10. The system of claim 9 wherein the insulation material is separated from the pipeline by an average standoff distance of between 3 and 6 inches.

11. The system of claim 9 wherein the outlet is comprised of an elongated flow passage extending upward approximately perpendicularly to the longitudinal axis of the pipeline for a distance between 1 and 6 feet.

12. The system of claim 11 wherein the insulation material is separated from the pipeline by an average standoff distance of between 3 and 6 inches.

13. The system of claim 9 wherein the ratio of the area of flow of the inlet to the area of flow of the annular space is between 1 and 4.

14. The system of claim 13 wherein the insulation material is separated from the pipeline by an average standoff distance of between 3 and 6 inches.

15. The system of claim 13 wherein the outlet is comprises of an elongated flow passage extending upward approximately perpendicularly to the longitudinal axis of the pipeline for a distance betwen 1 and 6 feet.

16. The system of claim 15 wherein the insulation material is separated from the pipeline by an average standoff distance of between 3 and 6 inches.

* * * * *